(12) United States Patent
Ennsmann (10) Patent No.: US 12,435,679 B2
(45) Date of Patent: Oct. 7, 2025

(54) EMBEDDED PISTON STRUCTURES

(71) Applicant: BRP-Rotax GmbH & Co. KG, Gunskirchen (AT)

(72) Inventor: Roland Ennsmann, Gunskirchen (AT)

(73) Assignee: BRP-Rotax GmbH & Co. KG, Gunskirchen (AT)

( * ) Notice: Subject to any disclaimer, the term of this patent is extended or adjusted under 35 U.S.C. 154(b) by 0 days.

(21) Appl. No.: 18/435,624

(22) Filed: Feb. 7, 2024

(65) Prior Publication Data

US 2024/0263598 A1     Aug. 8, 2024

Related U.S. Application Data

(60) Provisional application No. 63/483,643, filed on Feb. 7, 2023.

(51) Int. Cl.
    *F02F 3/00*      (2006.01)
    *F02F 3/28*      (2006.01)

(52) U.S. Cl.
    CPC ............ *F02F 3/0084* (2013.01); *F02F 3/285* (2013.01); *F05C 2201/021* (2013.01)

(58) Field of Classification Search
    CPC ....................................................... F02F 3/285
    See application file for complete search history.

(56) References Cited

U.S. PATENT DOCUMENTS

| | | | | |
|---|---|---|---|---|
| 1,946,081 | A | * | 2/1934 | Koch .................. F02F 3/285 92/213 |
| 3,251,349 | A | * | 5/1966 | Isley ................ F02B 23/0675 123/270 |
| 3,933,143 | A | * | 1/1976 | Gurtler ............. F02B 23/0639 123/193.6 |
| 4,137,887 | A | * | 2/1979 | Dunn ................ F02B 23/0636 123/193.6 |
| 2011/0155091 | A1 | * | 6/2011 | Kollotzek .............. F02F 3/22 123/193.6 |
| 2015/0354435 | A1 | * | 12/2015 | Wirkkala, II ........... F01P 3/10 123/41.35 |
| 2017/0248099 | A1 | * | 8/2017 | Wagner ............... F02B 75/282 |

FOREIGN PATENT DOCUMENTS

| | | | | |
|---|---|---|---|---|
| GB | 2164701 | A | * 3/1986 | ............ F02B 19/165 |
| WO | WO-2014097924 | A1 | * 6/2014 | ............... B22C 9/06 |

* cited by examiner

*Primary Examiner* — Thomas E Lazo
(74) *Attorney, Agent, or Firm* — Bochner PLLC; Joseph Farco (57) ABSTRACT

A piston, comprising a crown, an insert having an outer ring, an inner ring, and at least one interconnection between the outer ring and the inner ring, and a skirt integrally formed with the crown through the insert so that the crown and skirt are made from a type of aluminum and the insert is made from a material other than aluminum.

17 Claims, 6 Drawing Sheets

EMBEDDED PISTON STRUCTURES

RELATED APPLICATION

This application claims priority to U.S. Provisional Patent Application No. 63/483,643, filed Feb. 7, 2023, the disclosures of which are incorporated herein in their entirety.

FIELD OF THE INVENTION

The present invention relates to the field of piston construction for vehicular engines, and in particular, the location of components used in the construction and operation of the same to enable increased longevity and operative use.

BACKGROUND

Use of pistons in engines is well known and operative methods of manufacture and use of the same would be understood by persons of ordinary skill in the art. In general, pistons comprise a crown and a skirt, each of which being portions of the entire piston used to characterize the top (proximal surface to the combustion process) and bottom (proximal to the crankshaft), respectively. Due to their operational environment, it is desirable that pistons be made as robust as possible to withstand the loads, heat, and working conditions that may otherwise induce failure due to material limitations.

For example, in high power 2-stroke engines, the high temperatures and combustion pressures may reduce the stability of pistons, which are typically made of aluminum. In particular, this may cause excessive wear of the piston ring groove and deformation of the piston crown. There is a need to further support the piston crown.

At least one instance of a piston insert for a vehicular engine is described in International Application Publication No. WO2014/019945, the disclosures of which being incorporated herein by reference. That application is unlike the one disclosed herein.

SUMMARY

An exemplary piston may comprise a crown, an insert having an outer ring, an inner ring, and at least one interconnection between the outer ring and the inner ring, and a skirt integrally formed with the crown through the insert. According to this exemplary embodiment, the crown and skirt are made from a type of aluminum and the insert is made from a material other than aluminum.

In addition to the previously described embodiment and/or as an alternative to any other described exemplary embodiment, the piston may further comprise a groove in the outer ring in the same plane as a circumference of the piston.

In addition to the previously described embodiment and/or as an alternative to any other described exemplary embodiment, the piston may further comprise a plurality of interconnections between the outer ring and the inner ring.

In addition to the previously described embodiment and/or as an alternative to any other described exemplary embodiment, the piston may further comprise an aperture through the inner ring.

In addition to the previously described embodiment and/or as an alternative to any other described exemplary embodiment, the piston may further comprise an aperture through the inner ring.

In addition to the previously described embodiment and/or as an alternative to any other described exemplary embodiment, the piston may further comprise a plurality of interconnections between the outer ring and the inner ring.

In addition to the previously described embodiment and/or as an alternative to any other described exemplary embodiment, the piston may further comprise a plurality of interconnections between the outer ring and the inner ring.

In addition to the previously described embodiment and/or as an alternative to any other described exemplary embodiment, the piston may be configured such that each of the plurality of interconnections is equally spaced about a common axis of the outer ring and the inner ring.

In addition to the previously described embodiment and/or as an alternative to any other described exemplary embodiment, the piston may further comprise a channel along a radial direction of the outer ring and a groove in the outer ring.

In addition to the previously described embodiment and/or as an alternative to any other described exemplary embodiment, the piston may be configured such that the piston is operatively connected to an engine for a vehicle.

In addition to the previously described embodiment and/or as an alternative to any other described exemplary embodiment, the piston may be configured such that the engine for the vehicle is a two-stroke engine.

In addition to the previously described embodiment and/or as an alternative to any other described exemplary embodiment, the piston may be configured such that the engine for the vehicle is a four-stroke engine.

In addition to the previously described embodiment and/or as an alternative to any other described exemplary embodiment, the piston may be configured such that the at least one interconnection is angled so that the inner ring and the outer ring are not in the same plane.

In addition to the previously described embodiment and/or as an alternative to any other described exemplary embodiment, the piston may further comprise a channel through a thickness of the outer ring and a groove in the outer ring.

DESCRIPTION OF THE DRAWINGS

In the drawings like characters of reference indicate corresponding parts in the different and interchangeable and interrelated figures. Parts and components of each figure may be substitutes for other components in other figures to achieve the various methods and embodiments disclosed herein. Methods and protocols disclosed in any embodiment may be run in any order so as to affect their disclosed goals and/or enable performance of the systems as described. Additionally, any one embodiment may utilize any method or protocol described and in any portions, sequences, and combinations thereof.

DETAILED DESCRIPTION

Figure 1:
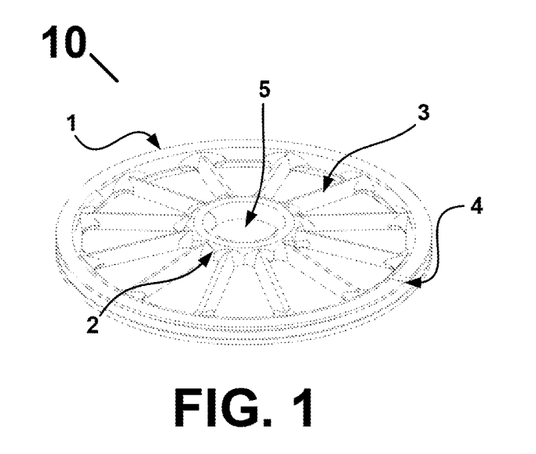
FIGS. 1-2 illustrate an exemplary isometric and profile view of a piston insert according to one exemplary embodiment of the inventions disclosed herein.
Figure 2:
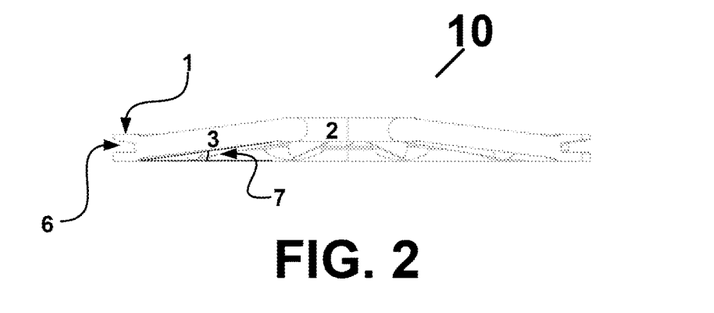

With reference to the illustrative embodiments described herein and illustrated in FIGS. 1-2, an exemplary embedded piston insert 10 may comprise an outer ring 1, an inner ring 2, and one or more stems 3 interconnecting a radially-inward surface of outer ring 1 to a radially-outward surface of inner ring 2. In an exemplary embodiment, the inner ring 2 of insert 10 may have an aperture 5. While outer ring 1 and inner ring 2 may be illustrated as circular structures, they may be any other polygonal shape or design depending on needs, e.g., square, hexagon, rhombus, oval. Alternatively and additionally, an exemplary outer ring 1 may have a channel 4 through its thickness, that is according to the illustrative embodiments, the thickness between its radially-outward surface to its radially-inward surface. However, an exemplary channel 4 may exist in any other shaped version of insert 10, including through corners and vertices of same.

As illustrated in FIG. 1, an exemplary embedded piston insert 10 may have an even number, an odd number, or any number of stems 3 interconnecting the outer ring 1 to the inner ring 2. In one embodiment, stems 3 may be integrally formed with rings 1 and 2 or welded thereto. In another embodiment, stems 3 may be joined to rings 1 and/or 2 with filleted surfaces to reduce the sharp angle changes between the stem 3 and the adjacent surfaces of the rings 1 and/or 2. Aperture 5 may be the result of a toroidal construction in ring 2 in which the radially-inward most geometry may be either flat, concave, convex, or other surface configurations. As may be understood to the person of ordinary skill in the art, an exemplary aperture 5 may be bounded by surfaces that extend radially away from the center of ring 2 such that when insert 10 is placed within a mold to form an exemplary piston (such as a piston shown in FIGS. 3-5, 6A-C, and 7), the material making up the piston, such as aluminum, fills into the vacant spaces formed by such radially extending surfaces in ring 2 and effectively locks insert 10 within the piston and avoids and/or eliminates any possibility of movement during piston operation.

With reference to the exemplary embodiment illustrated by FIG. 2, an exemplary insert 10 may have an outer ring 1 comprising a groove 6 extending radially-inwardly from the periphery of ring 1. As may be illustrated in FIG. 2, an exemplary stem 3 may be shown interconnected to ring 2 at an angle 7 extending upwardly from the lower-most surface of outer ring 1. Thus, in this alternative aspect of an embodiment of an insert 10 according to the disclosures herein, an exemplary ring 2 may be in a plane that is different (e.g., parallel and/or at an angle) from that of ring 1. In an exemplary embodiment, the convex configuration of an exemplary insert 10 due to angle 7 may enable tight fits between the insert 10 and the piston in which it is embedded. Furthermore, an exemplary insert 10 designed in accordance with FIG. 2 may allow for adequate spacing of the insert 10 with respect to other piston structures, vacancies, and openings. Thus, an exemplary insert 10 may be designed to be embedded within the piston in a way that is non-obstructive to other components and vacancies necessary for the operation of the piston.

Figure 3:
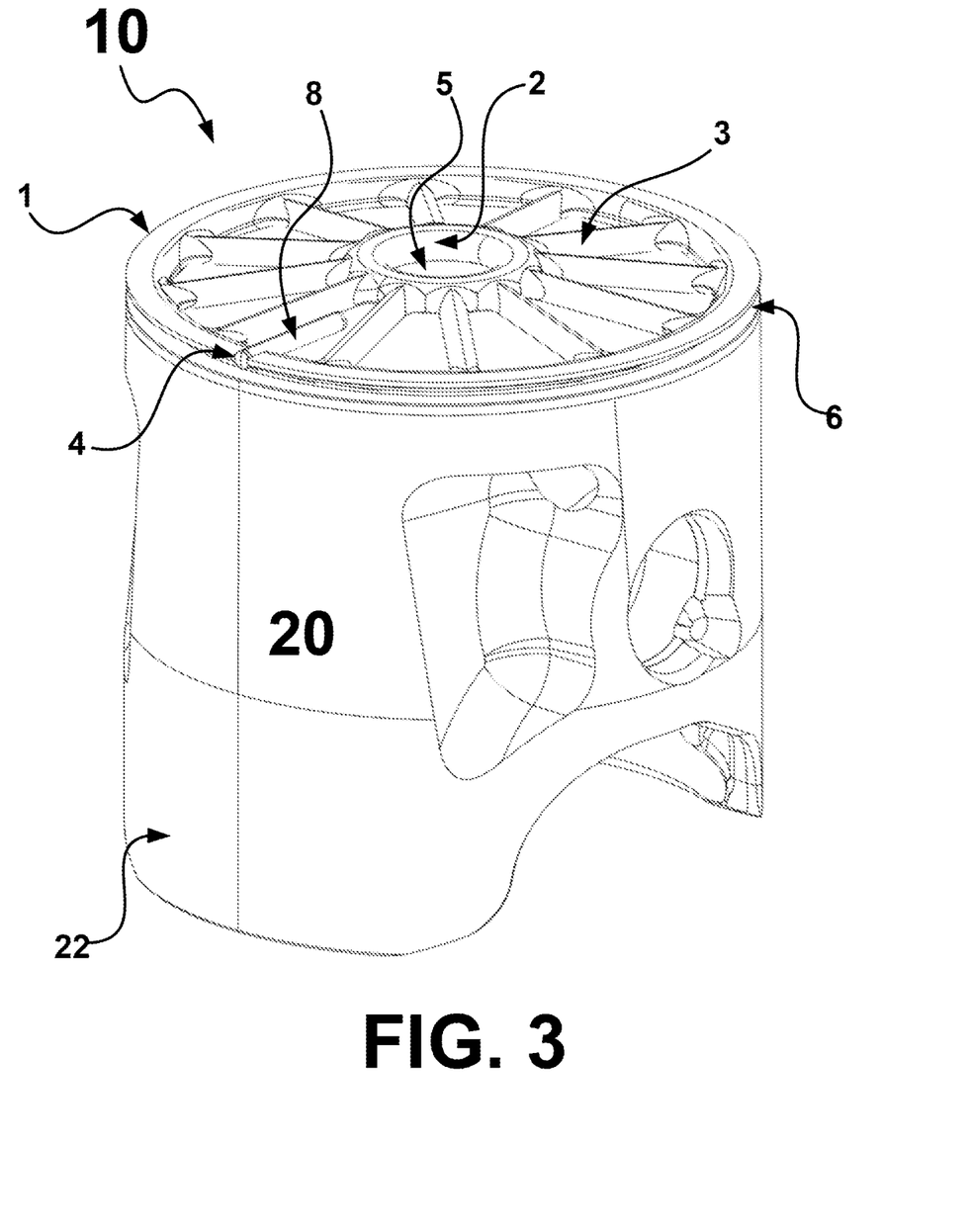
FIG. 3 illustrates an exemplary isometric view of an embedded piston insert in a partial section of a piston according to another exemplary embodiment of the inventions disclosed herein.

Referring now to the illustrative embodiment of FIG. 3, an exemplary piston 20 may be sectioned so as to show an exposed exemplary insert 10 disposed therein. In addition to the exemplary features discussed with respect to FIGS. 1-2, the illustrative embodiment depicted in FIG. 3 provides a retainer pin 8 disposed in the channel 4 in insert 10 such that it can pass into and through the surface of groove 6. An exemplary retainer pin 8 may be used to keep the piston ring in place during operation. While this retention is not as critical in 4-stroke engines, 2-stroke engine design may require the free ends of the piston ring to not extend into the intake or exhaust ports in the engine cylinder wall. Thus, an exemplary retainer pin 8 in an exemplary 2-stroke engine may ensure that the piston ring stays in the position so that the ring gap travels along a closed portion of the cylinder wall. Accordingly, an exemplary retainer pin 8 may have an "L" shape to enable adequate securing of the piston ring via a press-fit connection within an engine cylinder bore while keeping the ring gap as small as possible. In an exemplary embodiment, an exemplary retainer pin 8 may be used to hold an exemplary insert 10 in its position within piston 20 to avoid rotational displacement of the same during operation.

Alternatively, pin 8 may be one or more types of remnants of the molding process in which the exemplary insert 10 may be insertion molded within the piston 20 material during its casting. In other words, pin 8 may be a structure that may be used to suspend an exemplary insert 10 in the casting mold so that when the material forming the piston 20 is poured therein, it would engulf and flow through all available spacings formed between stems 3 and/or aperture 5 adjacent rings 1 and 2. In a further alternative embodiment, an exemplary retainer pin 8 may not be needed due to the nature in which the material making up the piston 20 is poured into and through the spacings formed by the stem(s) 3 and aperture 5 formed in and between ring 1 and/or ring 2. The aforementioned may also be true of other structures that are not retainer pin 8. As further detailed in FIG. 3, an exemplary piston 20 may be shown with its bottom portion, or skirt 22, descending from the radial axis of insert 10.

Figure 4:
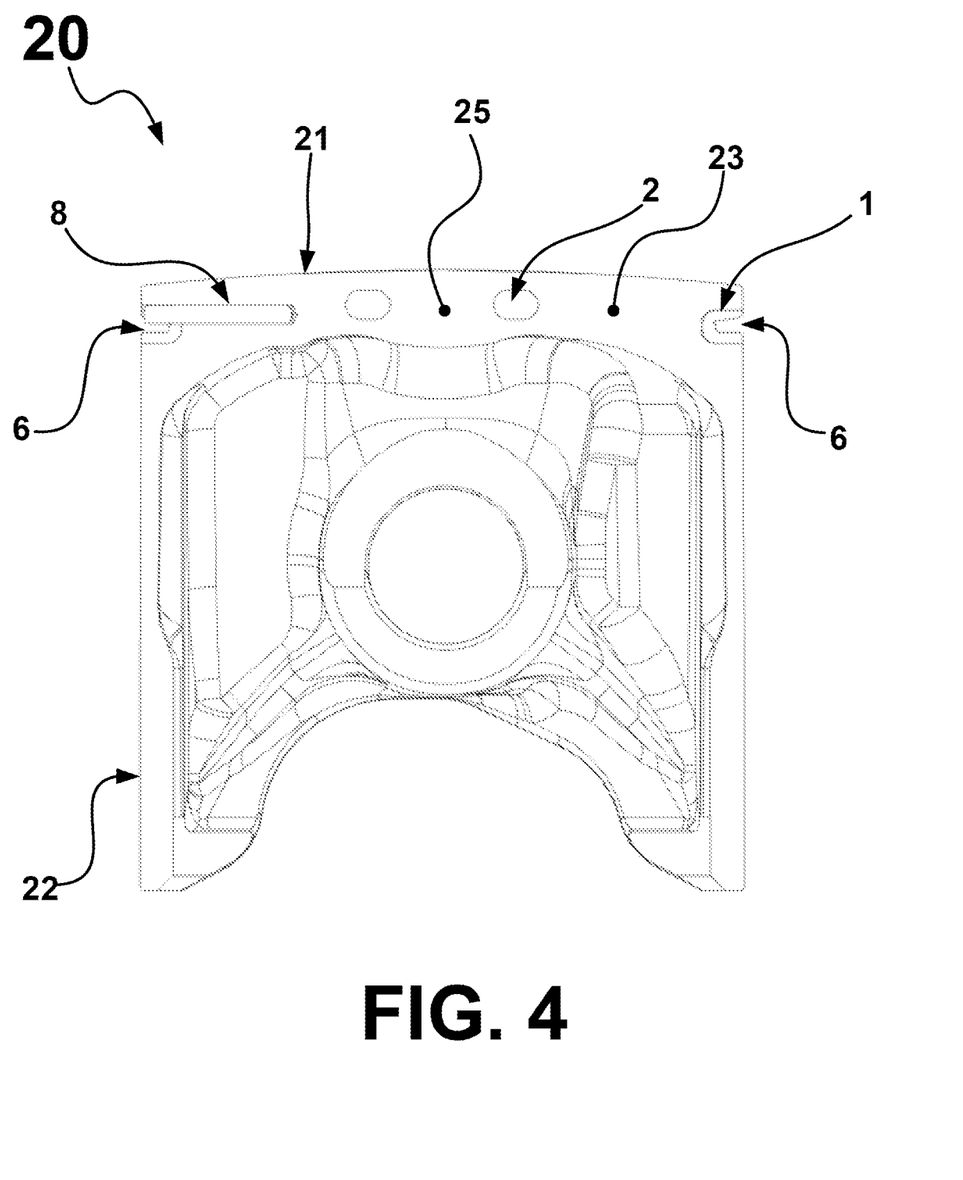
FIG. 4 illustrates a sectioned view of the profile of the exemplary embedded piston insert and full piston illustrated in FIGS. 1-3 providing an exemplary embodiment of other aspects of the inventions disclosed herein.
Figure 5:
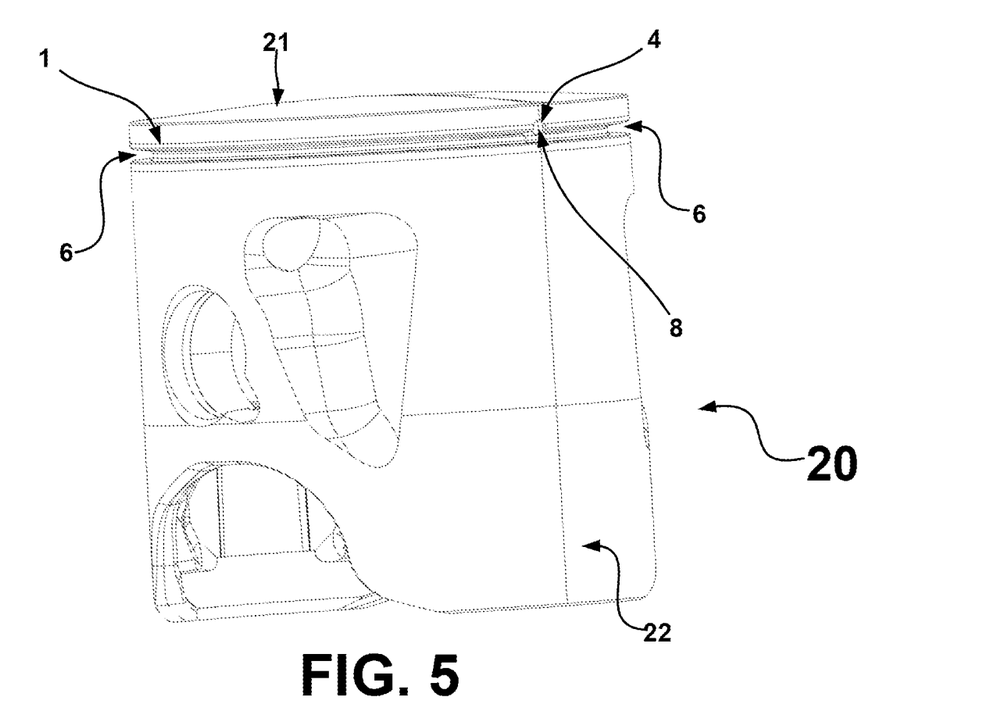
FIG. 5 illustrates an exemplary embodiment of another isometric view of a piston with an embedded piston insert according to aspects of the inventions disclosed herein.

Referring now to the illustrative embodiment depicted in FIG. 4, an exemplary piston 20 may be shown with an exemplary insert 10 integrally molded therein. As illustrated, the groove 6 in outer ring 1 may be shown with an exemplary retainer pin 8 passing through the same, such passage being enabled by the channel 4 formed in the former (not shown). As per the cross-section of FIG. 4, only a portion of the toroidal cross-section of inner ring 2 may be visible. As illustrated, an exemplary piston 20 may have a crown 21 formed atop the insert 10 such that material 23 and 25 may pass through the openings formed between rings 1 and 2 between each stem 3 (also not shown) and a skirt 22 descending therefrom. In other words, piston material 23 may reflect that material making up piston 20 that has engulfed the open areas formed between the radially inward surface of ring 1, the radially outward surface of ring 2, and each radially adjacent stem 3. In contrast, piston material 25 may reflet that material making up piston 20 that has engulfed and passed through aperture 5 formed in insert 10. As may be understood with reference to FIG. 4, the integrally insertion molded insert 10 may add to the strength, robustness, and operational fatigue resistance of piston 20 to enable it to withstand the loads, heat, and working conditions that may otherwise induce failure due to material limitations. FIG. 5 may provide a different vantage point for the illustrative embodiment illustrated in FIG. 4 with channel 4 being visible and the location of crown 21 with respect to the surfaces of outer ring 1 and groove 6.

Figure 6A:
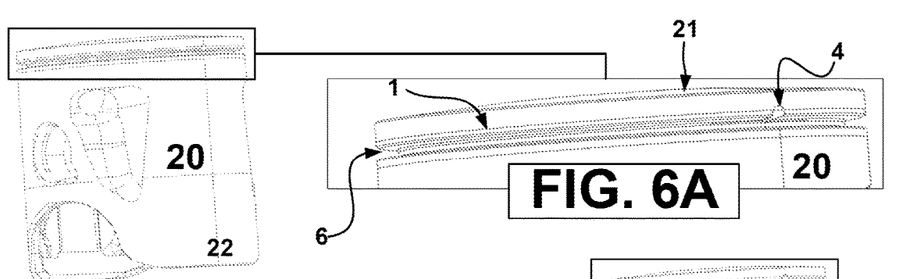
FIGS. 6A-C illustrates exemplary embodiments of the isometric view of the piston of FIG. 5 showing exploded views of features in FIG. 5 as well as additional features according to additional aspects of the inventions disclosed herein.
Figures 6B, 6C:
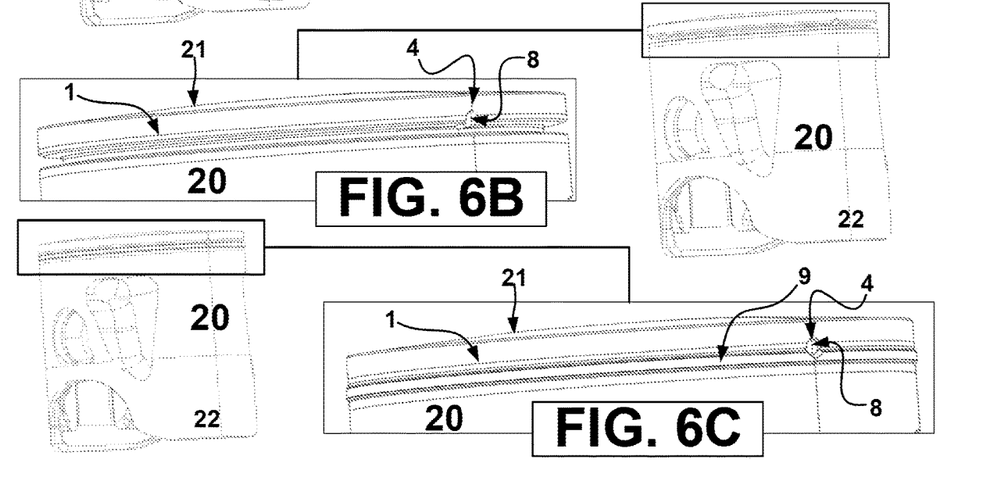
Figure 7:
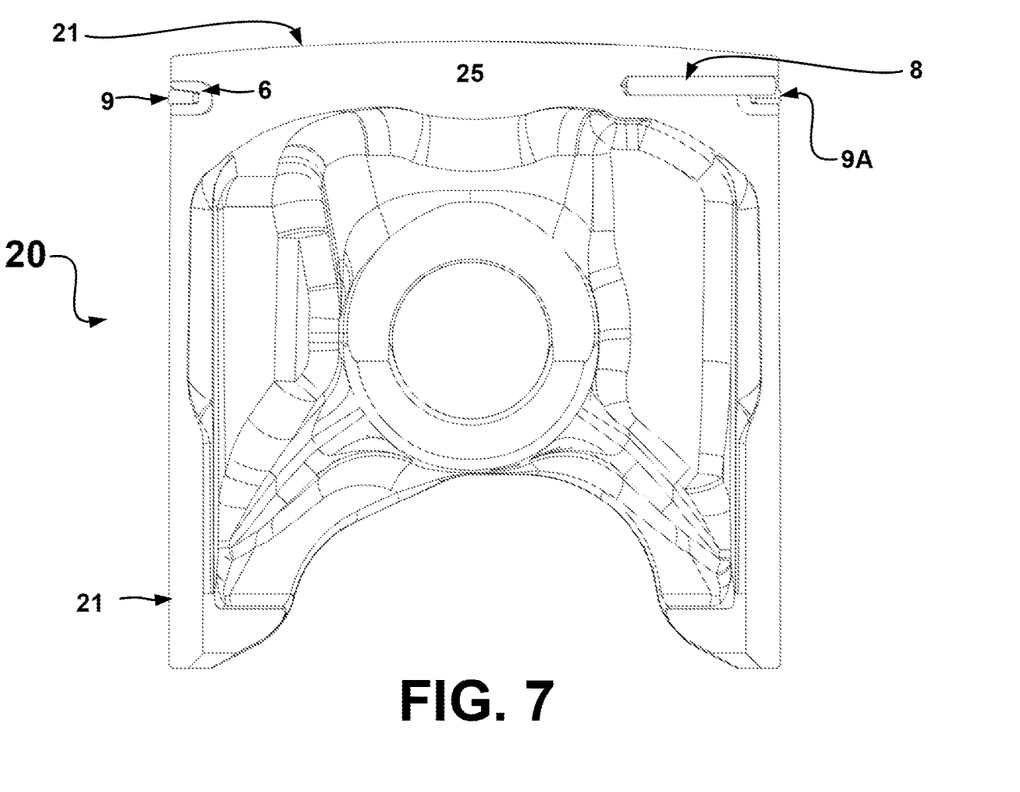
FIG. 7 illustrates a prior art piston without an embedded structure therein.

The illustrative embodiments of FIGS. 6A-C may provide an illustrated progression of formation and mounting arrangements for an exemplary piston 20 made according to the embodiments and disclosures herein. FIG. 6A may provide an exemplary piston 20 with embedded insert 10 therein with no retainer pin 8, but channel 4 and groove 6 formed in ring 1 located below piston crown 21. FIG. 6B may provide an exemplary piston 20 with embedded insert 10 therein and using an exemplar retainer pin 8 passing through channel 4 and the groove 6 formed in ring 1 located below piston crown 21. FIG. 6C may provide an exemplary piston 20 with embedded insert 10 therein with a retainer pin 8 passing through channel 4 and groove 6 formed in ring 1, but with an additional piston ring 9 lodged within the groove 6. Where piston ring 9 coincides with the location of retainer pin 8 and/or channel 4, the piston ring 9 may have a scalloped formation to engage retainer pin 8 within channel 4. In an exemplary embodiment, piston ring 9 may be placed on the embedded insert 10 groove 6 first and then aligned about the piston 20 using the coincidence of the scalloped formation in piston ring 9 and channel 4 so that in combination, the scalloped formation and channel 4 may create a uniform cylindrical cavity through which an exemplary retainer pin 8 may pass.

An exemplary piston 20 and exemplary insert 10 may be integrally formed by a metal casting process. An exemplary insert 10 may be first produced by a process of centrifugal casting, after which it may be pre-machined and then coated with aluminum by immersing it in a molten aluminum bath to facilitate bonding to the aluminum comprising an exemplary piston 20. An exemplary piston 20 may be cast from molten aluminum by a gravity casting process. According to one exemplary embodiment, an exemplary insert 10 may be placed in the mold while the piston 20 is being cast so that the piston 20 is formed with a groove 6 as a result of the insert 10 being insertion-molded within the piston 20. According to this exemplary embodiment, the integrally formed piston 20 and insert 10 may then be subjected to heat treatment for hardening of the materials, for relieving stress in the formed structures, and/or other such objectives. Thereafter, in further accordance with this exemplary embodiment, an exemplary piston 20 and integrated insert 10 may then be anodized to create a corrosion proof surface.

According to a yet further different exemplary embodiment, in which some or all of the prior techniques may be used, an exemplary retainer pin 8 may be used to suspend insert 10 within a casting mold so that no aluminum passing through insert 10 may get within groove 6 formed therein In other words, the casting mold may be only a one part mold with a cylindrical or other type passage through its thickness and into the cavity of the casting mold. Using an appropriately sized retainer pin 8 at one or more positions about outer ring 1 (e.g., an outer ring 1 having a plurality of channels 4, each capable of receiving an exemplary retainer pin 8 therein), an exemplary insert 10 may be held within the casting at a single location via the plurality of retainer pins so that aluminum can be passed over the same. According to this different exemplary embodiment, the retainer pins 8 may be removed after the casting process is completed so that the integrally molded piston 20 and insert 10 may be free to move out of the single cavity casting.

In an alternative embodiment, an exemplary piston 20 may be integrally molded with insert 10 using one or more of the techniques described, except that insert 10 does not yet have groove 6 therein. According to this alternative embodiment, groove 6 may be machined into the integrally molded insert 10 after casting piston 20 material therethrough, making the groove 6 a post-casting feature of the integrated piston 20. After casting of the piston 20 and insert 10, and after machining the groove 6 in the integrally molded insert 10 (e.g., machining outer ring 1 while it is embedded in piston 20), an exemplary milling operation may be used to form channel 4 through groove 6 for an exemplary retainer pin 8.

In an alternative embodiment, the stems 3 of the insert 10 may be directly connected to one another at a central hub or node, like the spokes of a car wheel, to be used to provide additional advantages. Alternatively, the stems 3 may be a plurality of different shapes and patterns depending on needs.

In each of the above embodiments, an exemplary insert 10 may be made of hardened steel, stainless steel, and alloys and composites of the same. In each of the above embodiments, an exemplary piston 20 may be made of aluminum or alloys of the same.

Many further variations and modifications may suggest themselves to those skilled in art upon making reference to above disclosure and foregoing interrelated and interchangeable illustrative embodiments, which are given by way of example only, and are not intended to limit the scope and spirit of the interrelated embodiments of the invention described herein.

The invention claimed is:

1. A piston, comprising:
   a crown;
   an insert having an outer member comprising a channel through a thickness of the outer member, an inner member, and at least one interconnection between the outer member and the inner member; and
   a skirt integrally formed with the crown through the insert,
   wherein the crown and skirt are made from a type of aluminum and the insert is made from a material other than aluminum.

2. The piston of claim 1, further comprising a groove in the outer member in the same plane as a circumference of the piston.

3. The piston of claim 2, further comprising a plurality of interconnections between the outer member and the inner member.

4. The piston of claim 3, further comprising an aperture through the inner member.

5. The piston of claim 1, further comprising an aperture through the inner member.

6. The piston of claim 5, further comprising a plurality of interconnections between the outer member and the inner member.

7. The piston of claim 1, further comprising a plurality of interconnections between the outer member and the inner member.

8. The piston of claim 7, wherein each of the plurality of interconnections is equally spaced about a common center of the outer member and the inner member.

9. The piston of claim 7, further comprising an aperture through the inner member.

10. The piston of claim 1, further comprising a channel along a radial direction of the outer member and a groove in the outer member.

11. The piston of claim 1, wherein the piston is operatively connected to an engine for a vehicle.

12. The piston of claim 1, wherein the outer member is an annular shape.

13. The piston of claim 12, wherein the inner member is an annular shape.

14. A piston, comprising:
- a crown;
- an insert having an outer member comprising a channel through a thickness of the outer membercomprising a channel through a thickness of the outer member and a groove in the outer member, an inner member, and a plurality of interconnections between the outer member and the inner member, wherein the at least one interconnection is angled so that the inner member and the outer member are not in the same plane; and
- a skirt integrally formed with the crown through the insert,
- wherein the crown and skirt are made from a type of aluminum and the insert is made from a material other than aluminum.

15. The piston of claim 14, wherein the piston is operatively connected to an engine for a vehicle.

16. The piston of claim 14, wherein the outer member is an annular shape.

17. The piston of claim 16, wherein the inner member is an annular shape.

* * * * *